United States Patent
Froehner et al.

(10) Patent No.: US 11,616,389 B2
(45) Date of Patent: Mar. 28, 2023

(54) METHOD AND ARRANGEMENT FOR DETECTING A TOPOLOGY IN A LOW-VOLTAGE NETWORK

(71) Applicant: Siemens Aktiengesellschaft, Munich (DE)

(72) Inventors: Wiebke Froehner, Amberg (DE); Thomas Werner, Rednitzhembach (DE)

(73) Assignee: Siemens Aktiengesellschaft, Munich (DE)

( * ) Notice: Subject to any disclaimer, the term of this patent is extended or adjusted under 35 U.S.C. 154(b) by 86 days.

(21) Appl. No.: 17/236,143

(22) Filed: Apr. 21, 2021

(65) Prior Publication Data

US 2021/0328458 A1    Oct. 21, 2021

(30) Foreign Application Priority Data

Apr. 21, 2020    (EP) .................................... 20170675

(51) Int. Cl.
    *H02J 13/00*    (2006.01)
    *G05B 19/042*   (2006.01)

(52) U.S. Cl.
    CPC ...... *H02J 13/00002* (2020.01); *G05B 19/042* (2013.01); *H02J 13/00022* (2020.01); *G05B 2219/2639* (2013.01)

(58) Field of Classification Search
    CPC ........... H02J 13/00002; H02J 13/00022; H02J 2203/10; H02J 2203/20; H02J 13/00007;
    (Continued)

(56) References Cited

U.S. PATENT DOCUMENTS 9,847,639 B2 * 12/2017 Hall .......................... H02J 3/14
9,893,385 B1 *  2/2018 Nayar ................. H01M 10/399
(Continued)

FOREIGN PATENT DOCUMENTS

DE    102012220846 B3    2/2014
EP         3324506 A1    5/2018
(Continued)

OTHER PUBLICATIONS

Reverse Address Resolution Protocol (RARP), known from a Wikipedia permanent link: https://en.wikipedia.org/wiki/Reverse_Address_Resolution_Protocol.

*Primary Examiner* — Ramesh B Patel
(74) *Attorney, Agent, or Firm* — Laurence A. Greenberg; Werner H. Stemer; Ralph E. Locher

(57) ABSTRACT

A method recognizes topology in low-voltage networks including local substations each having a plurality of output lines connected to a controllable electrical resource, and a control apparatus of each local substation. The method uses a computer arrangement assigning resources to the control apparatuses based on geographical proximity, selecting an assigned resource, transmitting a test control command specific to the selected resource from the control apparatus to the assigned resources, the test control command configured to trigger a change in power consumption or power output of the selected resource, measuring a change in an electrical variable on the output lines of the local substation by using a measuring apparatus, and assigning the selected electrical resource to that output line of that local substation on which a correlation between test control command and change is recognized. An arrangement for recognizing a topology in a low-voltage network is also provided.

17 Claims, 1 Drawing Sheet

(58) Field of Classification Search
CPC .......... G05B 19/042; G05B 2219/2639; Y02B 90/20; Y02E 60/00; Y04S 10/30; Y04S 20/00; Y04S 40/121; Y04S 40/126; Y04S 40/20

See application file for complete search history.

(56) References Cited

U.S. PATENT DOCUMENTS

| | | | |
|---|---|---|---|
| 9,960,637 B2* | 5/2018 | Sanders | H02J 3/388 |
| 10,073,429 B2* | 9/2018 | Froehner | G05B 19/05 |
| 11,119,824 B2* | 9/2021 | Clampitt, III | G06Q 10/06 |
| 11,355,930 B2* | 6/2022 | Veda | G01R 21/133 |
| 2021/0044438 A1* | 2/2021 | Bisale | H04L 9/32 |
| 2021/0296897 A1* | 9/2021 | Cruickshank, III | H02J 3/381 |
| 2021/0328458 A1* | 10/2021 | Froehner | H02J 13/00007 |
| 2022/0239607 A1* | 7/2022 | Jackson | H04L 47/827 |

FOREIGN PATENT DOCUMENTS

| | | |
|---|---|---|
| EP | 3070556 B1 | 12/2018 |
| EP | 3624290 A1 | 3/2020 |

* cited by examiner

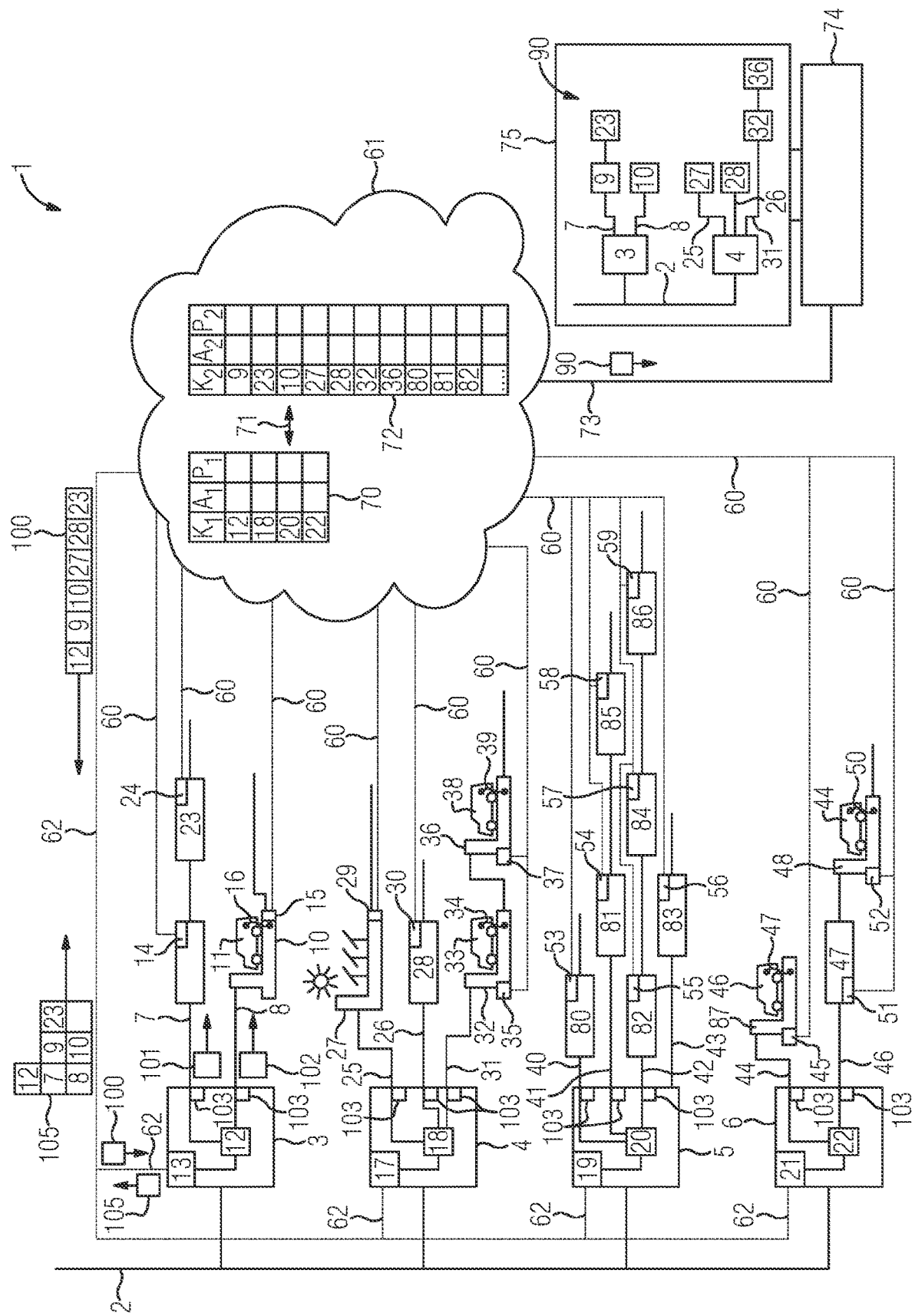

METHOD AND ARRANGEMENT FOR DETECTING A TOPOLOGY IN A LOW-VOLTAGE NETWORK

CROSS-REFERENCE TO RELATED APPLICATION

This application claims the priority, under 35 U.S.C. § 119, of European Patent Application EP 20170675.1, filed Apr. 21, 2020; the prior application is herewith incorporated by reference in its entirety.

BACKGROUND OF THE INVENTION

Field of the Invention

The invention relates to a method for recognizing a topology in a low-voltage network including local substations each having a plurality of output lines, in which each output line is connected to at least one controllable electrical resource, and each local substation has a control apparatus. The invention also relates to an arrangement for recognizing a topology in a low-voltage network.

In the decentralized control of networks, in particular of low-voltage networks, it is necessary to know, in a control device in a substation ("secondary substation"), for a number of application cases, which electrical resources (such as for example charging stations, heat pumps, PV systems, battery storage units, etc.) are contained in the subordinate network and to which outputs they are connected. One possible application case is for example a so-called "digital local network" in which a control device records the loading of the transformer and of the output cable and transmits control signals to the controllable loads in the local network in the event of overloading.

In low-voltage networks, distribution network operators are faced with the problem that those electrical resources are almost always owned by end consumers who select, install and operate those systems. The technical connection conditions generally provide an obligation to register those systems, in such a way that the distribution network operator is in principle aware of where the corresponding systems are located in the networks. It has however proven in practice that data collection and data flows for collection in distribution network companies are highly complex and marred by errors. Automated topology recognition in the control devices of the substation is therefore desirable. Initial implementations of decentralized control devices in local substations require specific data models that are introduced into the devices via corresponding interfaces.

Up until now, automated topology recognition has been performed for example on the basis of a method known from European Patent Application EP 3624290 A1. In that case, a control device in a local substation transmits a test control command, specific to a selected resource, on all of the output lines of the local substation, wherein the test control command is configured to trigger a change in a power consumption or power output of the selected resource. A change in the electric current is then measured on the output lines of the respective local substation. For that output line on which the change was measured, it is assumed that the selected resource is connected. The method makes use of the fact that the communication for the test signals takes place via an electrical line (a so-called "power line carrier communication"), which offers two advantageous properties for the topology recognition:

1. The control device is able to communicate only with resources to which it is also topologically connected. Resources located in other local networks are not able to be reached in terms of communication by the control device.
2. The communication apparatuses of the charging apparatuses register automatically in terms of communication in the local substation following installation on the control device. The control device thereby immediately recognizes that changes have taken place in its local network and may start to recognize the new topology.

BRIEF SUMMARY OF THE INVENTION

It is accordingly an object of the invention, based on the known method for recognizing a topology in a low-voltage network, to provide a method and an apparatus for detecting a topology in a low-voltage network, which overcome the hereinafore-mentioned disadvantages of the heretofore-known methods and arrangements of this general type and by way of which it is possible to recognize a topology very quickly, even in the case of very large and complex low-voltage networks.

With the foregoing and other objects in view there is provided, in accordance with the invention, a method for recognizing a topology in a low-voltage network including local substations each having a plurality of output lines, each output line being connected to at least one controllable electrical resource, and each local substation having a control apparatus, the method comprising the following steps performed by a computer arrangement:

assigning resources to the control apparatuses based on geographical proximity, and selecting an assigned resource, and transmitting a test control command specific to the selected resource from the respective control apparatus to the resources respectively assigned thereto, the test control command being configured to trigger a change in a power consumption or power output of the selected resource, and measuring a change in at least one electrical variable on the output lines of the respective local substation by way of a respective measuring apparatus, and assigning the selected electrical resource to that output line of that local substation on which a correlation between test control command and change is recognized.

In comparison with the previous method, in the invention, a preselection of the resources to be actuated by a control apparatus by way of the test control command takes place by selecting, based on geographical proximity, only the resources closest to a local substation for a "local" inspection of the topology.

A topology in the context of the invention is for example information about how an arrangement or electrical interconnection of lines and resources is formed in a specific example. By way of example, a topology includes information about which resources, such as for example charging columns for electric vehicles, are connected to which outputs or output lines of which local substation in a low-voltage network.

A low-voltage network is for example an electrical energy distribution network having a nominal voltage of for example 400 V in the case of three-phase AC voltage. The distribution network is generally connected to a superordinate medium-voltage network having a nominal voltage in the kV range via multiple local substations with transformers. For example, electrical energy consumers, such as for example single-household or multiple-household dwellings or charging columns for electric vehicles, are connected to the low-voltage network. Electrical energy generators may however also be connected to the low-voltage network, such as for instance photovoltaic systems on the dwellings mentioned at the outset.

A local substation in this case, in addition to a transformer, generally also has at least one communication apparatus. Provision is furthermore made for a control apparatus that is configured to create control commands for controllable resources, such as for example charging columns, and to transmit these by way of the communication apparatus. The control apparatus may be a computer with a data memory, an interface to the communication apparatus and a data processor.

When a local substation knows which controllable resources are connected to which of its output lines or outputs, the control apparatus may for example avoid unbalanced loads between individual phases or the like by actuating the resources. Load peaks are also able to be alleviated by way of scheduling for downstream consumers, such as for example dwellings.

Geographical proximity in the context of the invention means a physical distance between a local substation and a resource, for example a so-called "distance as the crow flies" or a direct distance without diversions, as may be easily ascertained for example from GPS data.

A test control command is for example a data telegram that is transmitted via the output lines through so-called power line communication or is modulated onto the low voltage. In another refinement, the test control command may however also be transmitted via wireless communication through radio signal or via wired communication, for example Internet-based communication. The test control command is for example created specifically for a resource and targets its identifier or communication address. It contains for example the command to activate the resource at full load, that is to say for example to briefly switch a charging column to maximum power consumption for 1 min. On the output line to which the charging column is connected, this leads to an increased load and may be recognized by way of the measuring apparatus.

An electrical variable that is able to be recorded by the respective measuring apparatus is for example the value of an electric current. As an alternative, a voltage and/or power and/or a frequency of the low voltage may also be measured on the output line.

The method according to the invention offers great advantages in the case of very large and complex low-voltage networks, in particular in the case of resources that are registered and parameterized through radio. When implementing digital local networks using radio-based communication networks, the advantages mentioned at the outset for the known method are specifically eliminated:

1. In a radio-based or Internet-based network, each control device in each local substation is in principle able to see each communication device of each resource that is located in or else outside the distribution network. In the case of an assignment described above using test control commands, that would mean that a control device would have to transmit test control commands to each resource. That would be extremely time-consuming and impractical due to the large number of resources in a complex low-voltage network if for example control apparatuses were retrofitted in a large number of local substations in a low-voltage network of a large town, for example, in order to transmit up to 50,000 test signals to controllable resources.

2. The communication apparatuses of the resources register only in the (central) communication system, and not directly with the control apparatus in the substation. It is thereby no longer possible for the control device to recognize that the topology in its local network has changed, and it has to start with a new topology recognition.

In one preferred embodiment of the method according to the invention, the recognized topology is used to create and to transmit control commands for all controllable resources connected to the output lines of a local substation during ongoing operation of the low-voltage network by way of the control apparatuses in such a way that unbalanced loads between the output lines of a local substation and/or overloading of individual output lines of a local substation are avoided.

In one preferred embodiment of the method according to the invention, the following temporally preceding steps are performed by way of the computer arrangement:
  providing a first data structure that has a first identifier and a first communication address and a first geographical position for each control apparatus, and
  providing a second data structure that has a second identifier and a second communication address and a second geographical position for each resource.

By way of example, the data structures may be simple tables or lists that contain a communication address and a geographical position for each identifier. This is an advantage because it is thereby particularly easy to compare the geographical distances between a control apparatus and all of the resources. The geographical position may in this case for example be stored in each case in the form of GPS coordinates.

The first identifier, first communication address and first geographical position of the control apparatuses in the local substations may in this case be queried, for example by a central control station for the medium-voltage network, and transmitted to the computer arrangement. As an alternative, when a control apparatus is installed in an existing local substation, its geographical position may be communicated to the computer arrangement, for example by using a mobile terminal such as a laptop. To this end, the first identifier of the control apparatus is recorded by the mobile terminal and sent, together with the geographical position, to the computer arrangement. Such a procedure is described for example in European Patent EP 3070556 B1, corresponding to U.S. Pat. No. 10,073,429.

The second identifier, second communication address and second geographical position of a resource in the low-voltage network may in this case for example be recorded automatically or by an engineer when the resource is installed and transmitted to the computer arrangement. In this case, a mobile device such as a laptop, a mobile telephone or a tablet having a GPS receiver or the like may be used.

By way of example, the control apparatuses and the resources each have a communication apparatus to which the communication address is assigned. A first communication address is for example an address of a communication apparatus of a control apparatus in the communication network for the local substations. A second communication address is for example an address of a communication apparatus of a resource in the communication network for the setup and parameterization of resources. By way of example, this may in each case be an Internet address or IP address.

The identifiers may be for example the name, the serial number or another freely configurable character string. As an alternative, a so-called MAC address of the communication device of the respective control apparatus or of the respective resource may also be used as an identifier. In this case, the computer arrangement ascertains the network address, for example using the so-called "Reverse Address Resolution Protocol (RARP)", known from a Wikipedia (permanent link: https://en.wikipedia.org/wiki/Reverse Address Resolution Protocol).

For the identifiers, for example, information about the kind of resource (charging column, battery, etc.) and operating parameters, such as for example maximum and minimum energy consumption, may be able to be stored. Following recognition of the topology, intelligent control of the energy consumption or of the energy generation of the resources by the control apparatuses is thereby made possible.

In one alternative refinement, provision may be made for only the second identifier respectively in the second data structure to be recorded by way of the computer arrangement. This is transmitted to the control apparatuses. The control apparatuses each independently ascertain the network addresses of the communication apparatuses of the resources, this taking place for example using the above-mentioned RARP. This embodiment is advantageous because it is thereby possible to dispense with direct communication of the computer arrangement with the communication devices of the resources.

Disassembly and renewed setup of a resource at another output or at another point in the low-voltage network in this case corresponds to reinstallation: if a new geographical position for the resource is transmitted, then the method according to the invention may be implemented again.

It may be the case in some situations that a communication apparatus for a resource is installed in a local network before the local substation has been equipped with a control apparatus. In this case, none of the control apparatuses informed by the computer arrangement will be able to recognize and assign this communication apparatus.

Provision is therefore made for the first and the second data structure to be reconstructed or updated if a new control arrangement is registered with the computer arrangement during the topology recognition. Based on geographical proximity, the address of the new communication device is likewise communicated to the new control apparatus, which begins the topology recognition by way of test control commands.

In one preferred development, the data structures are versioned by way of the computer arrangement. This is an advantage for documenting the temporal sequence of the assignments of the resources. By way of example, the versioning may be performed by storing a sequential number or a timestamp.

In a further preferred embodiment of the method according to the invention, the following steps are performed by way of the computer arrangement:
  providing a third data structure that contains, for each control apparatus, in each case the second identifier and/or the second communication address of all of the resources already assigned to the control apparatus. This is an advantage because the computer arrangement is thereby able to track which resources are assumed to be in the proximity of which control apparatus. By way of example, the third data structure may in each case be a simple list or matrix.

In a further preferred embodiment of the method according to the invention, the following steps are performed by way of the computer arrangement:
  providing a fourth data structure that contains the second identifier and/or the second communication address of all of the resources not yet assigned to a control apparatus. This is an advantage because the computer arrangement is thereby able to track which resources still have to be assigned. By way of example, the fourth data structure may be a simple list.

The proposed concept with the computer arrangement may also advantageously be used to announce to the control apparatuses in each case uninstallation, exchange or physical relocation of communication devices of the resources. If for example a communication device is uninstalled at the location of a resource, the operating sequences at the location are the same as those for the installation of the device.

First of all, a mobile terminal, such as for example a laptop, is used to record the second identifier of the communication device, and this is sent, together with a corresponding marker, to the computer arrangement, which looks up the assigned control apparatus in the third data structure. The computer arrangement informs this control apparatus about the uninstallation, whereupon the control apparatus removes the communication device from its own data retention and transmits a confirmation back to the computer arrangement.

Similarly, communication devices of two resources may easily be swapped by exchanging the identifiers or communication addresses in question in the data structures.

In a further preferred embodiment of the method according to the invention, the local substation transmits, to the computer arrangement, its output lines on which the selected resource was recognized. The computer arrangement adds the selected resource to the third data structure and erases the selected resource from the fourth data structure. The resources that were successfully recognized for the topology are thereby documented in the computer arrangement.

In the unlikely event that multiple control apparatuses believe that they have recognized the selected resource, the computer arrangement informs the control apparatuses in question that they should repeat the topology recognition process.

In a further preferred embodiment of the method according to the invention, the data structures are provided in the computer apparatus by the resources each wirelessly transmitting the respective identifier, communication address and geographical position by way of a communication apparatus. One advantage of wireless communication is that this is able to take place virtually without any complications and there is no need to set up any data communication via a line or via so-called power line communication. Latency times or a small bandwidth are also non-critical since, when setting up or reinstalling a resource, there is enough time available to transmit the data once.

In a further preferred embodiment of the method according to the invention, the wireless transmission takes place by way of radio signals in accordance with one of the following standards: W-LAN, long-range radio, mobile radio, 2G, 3G, 4G (LTE), 5G. This is an advantage because these standards are widespread and inexpensively available.

In a further preferred embodiment of the method according to the invention, the test control command is transmitted through data transmission via an electrical line. This may involve for example so-called "power line communication," that is to say that data in the form of a high-frequency signal are modulated onto a low voltage. This technique is well tested and is widespread, for example for smart meters. One advantage of data transmission via an electrical line is that this allows a secure and reliable connection and is for example comparatively insensitive to atmospheric interference—unlike radio signals.

In a further preferred embodiment of the method according to the invention, the test control command is transmitted through data transmission via wireless communication. This may be performed by way of radio signals in accordance with one of the following standards: W-LAN, long-range radio, mobile radio, 2G, 3G, 4G (LTE), 5G.

In a further preferred embodiment of the method according to the invention, the test control command is transmitted through data transmission via wired communication. By way of example, an Ethernet cable or an optical fiber may be used.

In a further preferred embodiment of the method according to the invention, data transmission takes place between the computer arrangement and the control apparatuses via an electrical line. This may involve for example so-called "power line communication." Communication between the control apparatuses and the computer arrangement is necessary only (typically once during setup, possibly multiple times with a changed configuration, etc.) for the transmission of assignment information, but not constantly for the ongoing operation of the digital local networks. This method may thereby also be used in distribution networks in which the communication between the control apparatuses and the computer arrangement is not stable and reliable.

In a further preferred embodiment of the method according to the invention, selection and transmission of a test control command take place in succession for all of the resources assigned to a control apparatus. This is an advantage because all of the resources assigned to a local substation are thereby able to be actuated iteratively and, if a significant change in an electrical variable is recognized on an output line, are able to be assigned. It is thus possible to gradually ascertain a topology of the low-voltage network.

In a further preferred embodiment of the method according to the invention, at least one of the following resources is used as an electrical resource: charging station for electric vehicles, heat pump, photovoltaic system, battery.

In a further preferred embodiment of the method according to the invention, a central server is used for the computer arrangement. By way of example, this functionality of the topology recognition may be integrated, as an additional software application, into an existing device management system that manages the control apparatuses of the local substations and supplies them with updates. It is thus not absolutely necessary to configure the computer arrangement as a separate system.

In a further preferred embodiment of the method according to the invention, the computer arrangement is configured as a cloud apparatus. A cloud apparatus in the context of the invention is a number of data storage and data processing resources that are connected to one another via a network, such as for example the Internet. A cloud apparatus has the advantage that it is easily able to be scaled to higher requirements during ongoing operation and is inexpensive, reliable and low-maintenance due to the IT infrastructure in the background provided by the cloud operator.

In a further preferred embodiment of the method according to the invention, the computer arrangement is disposed in a decentralized manner in the local substations, wherein data communication takes place in each case bilaterally with all of the local substations, in such a way that in each case a first and a second data structure are provided locally for each local computer apparatus of a local substation. In this variant, central management of the data structures and software components is not required, which is an advantage because it makes the overall system more robust against failures. Information may be exchanged for example by way of a so-called "blockchain" as a decentralized database, which is managed in a decentralized manner in copies in the control apparatuses.

In a further preferred embodiment of the method according to the invention, resources are assigned to control apparatuses based on geographical proximity by creating a list of resources for each control device, wherein the list is sorted according to geographical distance. This is an advantage because, in the case of sorting for example according to increasing distance, a test control signal is automatically generated first by the control apparatus for the resources that are most likely to be connected. This therefore saves on iterations, which makes the method according to the invention particularly fast and reliable as a result of a preselection of resources.

In a further preferred embodiment of the method according to the invention, only a defined number of geographically close assigned resources are selected from the respective sorted list for a control apparatus, wherein the number is defined on the basis of a geographical density of local substations in the surroundings of the local substation to which the control apparatus is assigned. This is an advantage because, in the case of local substations located very close to one another in densely populated areas, an excessively small number of nearby resources could easily be actuated, in such a way that correct assignment to the output lines would be made impossible. It is therefore expedient, for example in densely populated areas, to actuate a larger number of resources for the assignment than in sparsely populated areas.

Based on known arrangements for recognizing a topology in a low-voltage network, the invention is based on the object of specifying an arrangement by way of which it is possible to recognize a topology very quickly, even in the case of very large and complex low-voltage networks.

With the objects of the invention in view, there is also provided an arrangement for recognizing a topology in a low-voltage network, comprising:
  local substations each having a plurality of output lines, each output line being connected to at least one controllable electrical resource, and each local substation having a control apparatus, and
  a computer arrangement configured to assign the resources based on geographical proximity to the control apparatuses, and to select an assigned resource, and to transmit a test control command specific to the selected resource from a communication apparatus of the respective control apparatus to communication apparatuses of the resources respectively assigned thereto, the test control command being configured to trigger a change in a power consumption or power output of the selected resource, and
  a respective measuring apparatus on each output line of the local substations in each case being configured to measure a change in at least one electrical variable, and
  the computer arrangement being configured to assign the selected electrical resource to that output line of that local substation on which a correlation between test control command and change is recognized.

Preferred embodiments result from the dependent claims. The same advantages as mentioned at the outset for the method according to the invention also result analogously in this case.

A person skilled in the art may readily adopt, adjust or freely combine all of the embodiments set forth for the method according to the invention for the arrangement according to the invention.

Other features which are considered as characteristic for the invention are set forth in the appended claims.

Although the invention is illustrated and described herein as embodied in a method and an apparatus for detecting a topology in a low-voltage network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a schematic diagram showing one exemplary embodiment of the invention.

DETAILED DESCRIPTION OF THE INVENTION

Referring now in detail to the single FIGURE of the drawing, there are seen four local substations 3, 4, 5, 6 which are connected to a medium-voltage network 2 of a town. The local substations 3, 4, 5, 6 each have a transformer (not illustrated) in order to provide a low voltage for a downstream low-voltage network. Each local substation has a control apparatus 12, 18, 20, 22, which is configured as a computer with a data memory, a processor device and an interface to a respective communication apparatus 13, 17, 19, 21. Each of the local substations 3, 4, 5, 6 has a plurality of output lines 7, 8, 25, 26, 31, 40, 41, 42, 43, 44, 46 that provide a low voltage for the low-voltage network. In each case one or more controllable resources 9, 23, 10, 27, 28, 32, 36, 80-86, 87, 47, 48 are installed on the output lines 7, 8, 25, 26, 40, 41, 42, 44, 45, 46. For example, controllable resources 10, 32, 36, 37, 48 may be charging columns for electric vehicles 11, 33, 38, 46, 49 that are connected via charging cables 16, 34, 39, 47, 50, or else photovoltaic systems 27. Controllable resources 23, 51 may be heat pumps or controllable resources 9, 28, 80-86 may be batteries.

A measuring apparatus for measuring at least one electrical variable is provided on each of the output lines 7, 8, 25, 26, 31, 40-44, 46. In the case shown herein, the respective magnitude of a current flow on the respective output lines is measured by way of the measuring apparatus 103.

Each of the controllable resources has a communication apparatus 14, 24, 50, 29, 30, 35, 37, 45, 51-59, these being configured to provide a wireless data communication link 60 (indicated by dashed lines) through mobile radio (for example through LTE).

In contrast thereto, the communication apparatuses 13, 17, 19, 21 of the local substations 3, 4, 5, 6 are configured to provide a data communication link 62 through so-called "power line communication" (indicated by dashed lines). The data communication links 60, 62 allow data to be exchanged with a computer apparatus 61, 73, 74, 75. This is in this case a server apparatus provided in a cloud 61 and having corresponding software applications.

The data communication links 60 may in this case be provided for the cloud apparatus 61 via appropriate radio-based gateways and the Internet. The data communication with the local substation 62 may for example take place in a manner routed via a control station (not illustrated), wherein, from the cloud apparatus 61, Internet-based data communication takes place with the control station and, from there, power line communication takes place directly to the local substations 3, 4, 5, 6 via power lines.

A desktop computer 74 having a display device 75 is connected to the cloud apparatus 61 via an Internet connection 73. A topology 90 of the low-voltage network, as recognized by way of the method according to the invention, may be displayed to a user on the display device 75 or monitor. By way of example, a section of the low-voltage network that is disposed downstream of the local substations 3, 4 is illustrated herein. The core concept of the topology recognition according to the invention is that the resources 9, 10, 23, 27, 28, 32, 36 connected to the output lines 7, 8, 25, 31 are each assigned correctly to the illustrated output lines 7, 8, 25, 26, 31. By way of example, it has been correctly recognized that the resources 9 and 23 are connected to the output line 7 of the local substation 3.

The operation of the method according to the invention is intended to be explained in more detail below:

If for example the intention is to establish a topology of the low-voltage network disposed downstream of the local substation 3, that is to say the assignment of the resources 9, 23, 10 to the output lines 7, 8 of the local substation 3, then in each case the identifier K2 of the resource, the communication address A2 of the resource or the respective communication apparatus 14, 24, 15 and a geographical position P2 are transmitted by the resources 9, 23, 10 or the communication apparatuses 14, 24, 15 via the data communication link 60.

The geographical position is a GPS coordinate that is able to be ascertained for example by way of a GPS receiver. As an alternative or in addition, when the resource 9, 23, 10 is installed on an output line 7, 8 by an engineer, the geographical position may be recorded and provided for transmission by way of a mobile terminal such as a laptop or a tablet.

The transmitted data are received in the cloud apparatus 61 and recorded there in a second data structure 72, which is indicated as a simple table. For each resource in the low-voltage network, the table 72 therefore stores an identifier K2 for which for example information about the kind of resource (charging column, battery, etc.) and operating parameters, such as for example maximum and minimum energy consumption, are able to be retrieved.

A table, specifically a first data structure 70, is likewise applied for the control apparatuses. This table in each case contains a first identifier $K_1$ of the control apparatuses 12, 18, 20, 22 and a first communication address $A_1$ of the local substations or of the communication apparatus 13, 17, 19, 21 and a geographical position $P_1$ of the local substations. By way of example, the information required for the table 70 may be queried from a geographical information system from a control station for the medium-voltage network 2 or the downstream low-voltage network. As an alternative, these data may also be provided and transmitted when a control apparatus 12, 18, 20, 22 is installed or retrofitted by an engineer.

According to the invention, assignment or matching of control apparatuses to resources located in the geographical proximity is then performed on the basis of the two data structures 70, 72. This is performed on the basis of the geographical positions $P_1$ and $P_2$ that are stored in the data structures 70, 72. By way of example, for the control apparatus 12 or the local substation 3, it results in the resources 9, 10, 27, 28, 23 (in increasing geographical distance) being located close to the control apparatus 12 or local substation 3.

This results in a high probability of some of these resources being connected to the output lines 7, 8 of the local substation 3. The assignment or preselection of resources is transmitted to the communication apparatus 13 of the local substation 3 for the control apparatus 12 by way of a data telegram 100 and made available to the control apparatus 12 there. The control apparatus 12 selects a preselected or assigned resource, such as for example the resource 9, and transmits specific test control commands 101, 102 for this selected resource 9 through power line communication via the output lines 7, 8 to the presumably downstream resources 9, 23, 10, 27, 28, etc.

Since the resources 27, 28 are however located on the output lines 25 and 26, respectively, of the local substation 4, they do not receive the test control commands 101, 102. The resource 10 receives the test control command 102, but does not change its energy draw, because the test control command 102 is configured to control only the resource 9. The same applies to the resource 23 which, although it receives the control command 101, likewise does not adjust its energy consumption, because the test control command 101 is not intended for this resource. The resource 9 however receives the test control command 101 and changes its energy consumption.

By way of example, the power consumption is lowered to 0 kW for a predefined interval of 1 minute, or the resource 9 is deactivated. As an alternative, a maximum power draw may also be provided for a predefined time. This change in power consumption may be recognized by way of the measuring apparatus disposed on the output line 7, for example on the basis of a flowing current. This change accordingly lasts for the predefined time window of 1 min and then returns to the starting level. The measuring apparatus 103 of the output line 8 cannot recognize such a change. The control apparatus 12 accordingly records the fact that the resource 9 must be disposed on the output line 7.

If it is not possible to ascertain that any clear change or other defects in the low-voltage network are overlaid on the measurements of the measuring apparatus 103, then the abovementioned topology recognition steps may be performed multiple times. It is thereby statistically relatively simple to recognize, after a few run-throughs, that the test control commands 101, 102 were actually decisive for the changes in the measured variables on the output lines 7, 8, and accordingly make an assignment possible.

The control apparatus 12 will then create other test control commands for the other preselected resources 10, 27, 28, 23 in succession and measure changes on the output lines 7, 8. By virtue of this iterative method, it is gradually recognized that the resources 9, 23 are disposed on the output line 7 and the resource 10, a charging column for electric vehicles, is disposed on the output line 8. This information may be transmitted to the cloud apparatus 61 via the data communication link 62 by way of a data telegram 105. An assignment is also similarly performed and processed to form topology information for the other resources and output lines of the local substations 4, 5, 6. This topology information 90 may then be displayed to a user of the desktop apparatus 74, 75 in the form of a graph or table by way of the cloud apparatus 61.

The invention claimed is:

1. A method for recognizing a topology in a low-voltage network including local substations each having a plurality of output lines, each output line being connected to at least one controllable electrical resource, and each local substation having a control apparatus, the method comprising the following steps performed by a computer arrangement:
   matching resources to control apparatuses based on distances between the resources and the control apparatuses, wherein each of the resources is selected from the group consisting of electrical energy consumers and electrical energy generators;
   selecting a resource from the resources;
   transmitting a test control command, which is specific to the selected resource, from a respective control apparatus to the resources respectively assigned thereto, the test control command configured to trigger a change in a power consumption or power output of the selected resource;
   measuring a change in at least one electrical variable on the output lines of a respective local substation by a respective measuring apparatus, wherein each of the at least one electrical variable is selected from the group consisting of a current, a voltage, a power, and a frequency; and
   recognizing that the selected electrical resource is connected to an output line of a local substation based on a correlation between the test control command and the measured change in the electrical variable.

2. The method according to claim 1, which further comprises performing temporally preceding steps by way of the computer arrangement as follows:
   providing a first data structure having a first identifier, a first communication address and a first geographical position for each control apparatus; and
   providing a second data structure having a second identifier, a second communication address and a second geographical position for each resource.

3. The method according to claim 2, which further comprises providing the data structures in the computer arrangement by using each of the resources to wirelessly transmit the respective identifier, communication address and geographical position by way of a communication apparatus.

4. The method according to claim 3, which further comprises carrying out the wireless transmission by way of radio signals in accordance with a standard selected from the group including: W-LAN, long-range radio, mobile radio, 2G, 3G, 4G (LTE) and 5G.

5. The method according to claim 1, which further comprises transmitting the test control command through data transmission via an electrical line.

6. The method according to claim 1, which further comprises carrying out selection and transmission of a test control command in succession for all of the resources assigned to a control apparatus.

7. The method according to claim 1, which further comprises using as an electrical resource at least one resource selected from the group including: a charging station for electric vehicles, a heat pump, a photovoltaic system and a battery.

8. The method according to claim 1, which further comprises using a central server for the computer arrangement.

9. The method according to claim 1, which further comprises configuring the computer arrangement as a cloud apparatus.

10. The method according to claim 1, which further comprises providing the computer arrangement in a decentralized manner in the local substations, and carrying out each data communication bilaterally with all of the local substations in such a way that a respective first and a respective second data structure are provided locally for each local computer apparatus of a local substation.

11. The method according to claim 1, which further comprises assigning resources to control apparatuses based on geographical proximity by creating a list of resources for each control device, and sorting the list according to geographical distance.

12. The method according to claim 11, which further comprises selecting only a defined number of geographically close assigned resources from the respective sorted list for a control apparatus, and defining the number based on a geographical density of local substations in surroundings of the local substation to which the control apparatus is assigned.

13. The method according to claim 1, which further comprises: avoiding unbalanced loads or avoiding overloading at the local substation by transmitting control commands to electrical resources connected to the output lines of the local substation.

14. An arrangement for recognizing a topology in a low-voltage network, the arrangement comprising:
   local substations each having a plurality of output lines, each of said output lines being connected to at least one controllable electrical resource, and each of said local substations including a control apparatus having a communication apparatus;
   a computer arrangement configured to match the resources based on distances between the resources and said control apparatuses, to select an assigned resource, to transmit a test control command specific to the selected resource from said communication apparatus of a respective one of said control apparatuses to communication apparatuses of the resources respectively assigned thereto, said test control command configured to trigger a change in a power consumption or power output of the selected resource, wherein each of the resources is selected from the group consisting of electrical energy consumers and electrical energy generators;
   a respective measuring apparatus disposed on each output line of said local substations and configured to measure a change in at least one electrical variable, wherein each of the at least one electrical variable is selected from the group consisting of a current, a voltage, a power, and a frequency; and
   said computer arrangement configured to recognize that the selected electrical resource is connected to said output line of one of said local substations based on a correlation between the test control command and the measured change in the electrical variable.

15. The arrangement according to claim 14, wherein said computer arrangement is configured to perform temporally preceding steps as follows:
   providing a first data structure having a first identifier, a first communication address and a first geographical position for each control apparatus; and
   providing a second data structure having a second identifier, a second communication address and a second geographical position for each resource.

16. The arrangement according to claim 15, wherein said computer arrangement is configured to provide said data structures by using each of the resources to wirelessly transmit said respective identifier, said address and said geographical position by way of said communication apparatus.

17. The arrangement according to claim 14, wherein: said computer arrangement is configured to avoid unbalanced loads or to avoid overloading at the local substation by transmitting control commands to controllable electrical resources connected to output lines of the one of said local substations.

* * * * *